(12) United States Patent
Tsubai (10) Patent No.: US 7,958,849 B2
(45) Date of Patent: Jun. 14, 2011

(54) EGG ROLL OUT MECHANISM FOR EGG COLLECTOR

(75) Inventor: Yasushi Tsubai, Kakamigahara (JP)

(73) Assignee: Hytem Co., Ltd., Gifu (JP)

( * ) Notice: Subject to any disclaimer, the term of this patent is extended or adjusted under 35 U.S.C. 154(b) by 431 days.

(21) Appl. No.: 12/296,030

(22) PCT Filed: Apr. 6, 2006

(86) PCT No.: PCT/JP2006/307357
§ 371 (c)(1),
(2), (4) Date: Oct. 3, 2008

(87) PCT Pub. No.: WO2007/113919
PCT Pub. Date: Oct. 11, 2007

(65) Prior Publication Data
US 2009/0159012 A1    Jun. 25, 2009

(51) Int. Cl.
*A01K 31/10* (2006.01)
*A01K 31/17* (2006.01)
(52) U.S. Cl. .................................................. 119/337
(58) Field of Classification Search .................. 119/329, 119/334, 335, 336, 337, 338
See application file for complete search history.

(56) References Cited

U.S. PATENT DOCUMENTS

| 3,789,802 | A | * | 2/1974 | Conley | 119/337 |
| 4,159,696 | A | * | 7/1979 | Martin | 119/337 |
| 4,199,051 | A | * | 4/1980 | Kimberley | 198/448 |
| 5,279,254 | A | * | 1/1994 | Dowty | 119/337 |
| 2009/0107801 | A1 | * | 4/2009 | Smith | 198/369.2 |

FOREIGN PATENT DOCUMENTS

| JP | 3418267 | 4/2003 |
| JP | 2003-259754 | 9/2003 |
| JP | 3584150 | 8/2004 |

* cited by examiner

*Primary Examiner* — Timothy D Collins
*Assistant Examiner* — Monica Williams
(74) *Attorney, Agent, or Firm* — Stites & Harbison PLLC; Douglas E. Jackson (57) ABSTRACT

The invention relates to an egg collection conveyor and a vertical feeding device for egg collection, and particularly relates to an egg roll out mechanism for an egg collector. The egg collection conveyor collects eggs produced at each cage of a multiple-stage chicken cage and conveys the eggs to horizontally one end side of the conveyor. The vertical feeding device for egg collection is provided on one end side of the multiple-stage chicken cage, conveys the eggs in the vertical direction, and discharges the eggs, collected by the egg collection conveyor, at a previously set position. The vertical feeding device has egg placement means on which eggs are placed and that discharges the eggs at a desired position. The egg placement means has a space section directly under the position where an egg is placed and the space can be in contact with the bottom surface of the egg. The vertical feeding device is connected to an endless conveyor for conveying the collected eggs to a desired position. A projection for egg roll out is provided on the downstream side of the egg placement means and the distance of the projection relative to the egg placement means is changed corresponding to a change in the conveyance direction of the endless conveyor. In the egg roll out mechanism, when the relative distance is minimum, the egg roll out mechanism causes an end of the projection to reach the space section to help rolling out of an egg.

2 Claims, 6 Drawing Sheets

EGG ROLL OUT MECHANISM FOR EGG COLLECTOR

TECHNICAL FIELD

The present invention relates to an egg roll out mechanism for an egg collector having an egg collection conveyor for collecting eggs laid by poultry confined in the cages of cage tiers arranged in a poultry cage unit for hens and conveying them to the side of one of the longitudinal opposite ends of the cages and an egg collection/vertical transfer device for vertically transferring the eggs being conveyed to a predetermined position. More particularly, the present invention relates to an egg roll out mechanism adapted to reliably discharge eggs at a predetermined appropriate position (height) when the egg collection/vertical transfer device is delivering eggs.

BACKGROUND ART

An egg collection/vertical transfer device is required to accurately deliver eggs to an egg inlet of a prearranged cumulative egg collection conveyor, for example, without occurring any falling of an egg. However, the egg receiving means of conventional egg collection/vertical transfer devices can be in trouble from time to time and hold an egg for an unnecessarily prolonged period of time. Then, the held egg is released to fall at a position beyond the egg inlet to smear the egg receiving means or transferred further beyond the egg inlet of the cumulative egg collection conveyor so as to ultimately fall from the egg receiving means and contaminate the surroundings and give rise to an unsanitary condition.
[Patent Document 1] Japanese Patent Application Laid-Open Publication No. 2003-259754

DISCLOSURE OF THE INVENTION

Problems to be Solved by the Invention

The eggs put on the egg receiving means of the egg collection/vertical transfer device are delivered to the cumulative egg collection conveyor that is arranged, for instance, at a high position. At this time, the egg on the egg bearing bars of each of the egg receiving means may be delivered onto the cumulative egg collection conveyor typically as the chains of the egg collection/vertical transfer device are warped outward from the proper vertical track of the egg collection/vertical transfer device at a predetermined corresponding height. Normally, the egg is delivered without any problem. However, when the egg is of an extremely small size, when the egg is broken on the way of being transferred for some reason or another and the broken egg adheres to the bearing bars to make the latter unexpectedly sticky or when an unexpected humidity (moisture) exists around the egg bearing bars, the egg may not be delivered from the egg bearing bars onto the cumulative egg collection conveyor properly at the predetermined position but simply moved further or, if delivered onto the cumulative egg collection conveyor, it may be delivered in an very unstable condition.

A scarper may be provided to prevent any egg from being held for an unnecessarily prolonged period of time. However, the provision of a scraper whose effective surface area is inevitably large and can be subjected to serious contaminations is disadvantageous from the sanitary point of view and may involve difficult cleaning operations to consequently reduce the quality of the eggs transferred onto the cumulative egg collection conveyor as a whole. Therefore, there is a demand for sanitarily more advantageous techniques.

Therefore, the object of the present invention is to provide an egg roll out mechanism of an egg collector that can deliver each egg onto a cumulative egg collection conveyor at a predetermined timing and hence at a predetermined position even in an unexpected condition.

Means for Solving the Problems

According to the present invention, the above object is achieved by providing an egg roll out mechanism of an egg collector comprising:

a multi-tier poultry cage unit for hens having a plurality of vertically arranged cage tiers;

a plurality of egg collection conveyors extending longitudinally along the respective cage tiers and arranged to collect the eggs laid by the hens confined in the cage cells of the cage tiers and convey them to one of the horizontal and longitudinal opposite ends of the cage tiers; and an egg collection/vertical transfer device arranged at one of the opposite ends of the multi-tier poultry cage unit for hens and adapted to receive the eggs conveyed by the egg collection conveyors and by turn transfer the eggs upward or downward to a predefined position; and the egg collection/vertical transfer device including:

a plurality of egg receiving members for receiving eggs from the egg collection conveyors;

an endless conveyor mounted with the egg receiving members and adapted to be driven to rotate and move mainly in vertical directions; and a plurality of egg roll out cross bar members arranged respectively adjacent to the egg receiving members at the lower side thereof;

each of the egg receiving members having a space section for holding the bottom of the egg it bears in suspension;

the relative distance between each of the egg receiving members and the corresponding one of the egg roll out cross bar members being adapted to change according to the change in the transfer direction of the endless conveyor, the relative distance being made minimal at the predefined delivery position of the egg receiving member of the egg collection/vertical transfer device so as to allow the corresponding egg roll out cross bar member get to the space section.

Preferably, each of the egg roll out cross bar members gets to the corresponding space section at the delivery position of the corresponding egg receiving member of the egg collection/vertical transfer device.

ADVANTAGES OF THE INVENTION

An egg roll out mechanism of an egg collector according to the present invention as defined above employs an egg collection conveyor for collecting the eggs laid by the hens confined in the respective cage cells of the cage tiers arranged in a multi-tier poultry cage unit for hens and transferring them to one of the longitudinal opposite ends.

The egg collection/vertical transfer device is adapted to receive the eggs conveyed by the egg collection conveyors and by turn transfer the eggs upward or downward to the cumulative egg collection conveyor at a predefined position.

The egg collection/vertical transfer device includes a plurality of egg receiving members for receiving eggs from the egg collection conveyors, an endless conveyor mounted with the egg receiving members and adapted to be driven to rotate and move mainly in vertical directions and a plurality of egg roll out cross bar members arranged respectively adjacent to the egg receiving members at the lower side thereof.

Each of the egg receiving members has a space section for holding the bottom of the egg it bears in suspension.

The relative distance between each of the egg receiving members and the corresponding one of the egg roll out cross bar members is adapted to change according to the change in the transfer direction of the endless conveyor, the relative distance being made minimal at the predefined delivery position of the egg receiving member of the egg collection/vertical transfer device so as to allow the corresponding egg roll out cross bar member get to the space section.

Thus, with the above described arrangement, while the egg borne by an egg receiving member may have difficulty in coming out from the egg receiving member in a situation where the bottom of the egg is suspended in the space section when the egg is small, the egg roll out cross bar member then moves to the space section where the bottom of the egg is located and pushes out from below to force the egg reliably roll out onto the cumulative egg collection conveyor.

It is desirable that the egg roll out cross gets to the space section when the egg is at the delivery position. A guide sprocket may typically be employed to determine the moving direction (angle) of the endless conveyor so as to maximize the angular change in the moving direction of the endless conveyor at the egg delivery position.

BEST MODE FOR CARRYING OUT THE INVENTION

Now, the present invention will be described in greater detail by referring to the accompanying drawings that illustrate a preferred embodiment of egg roll out mechanism according to the invention.

Figure 1:
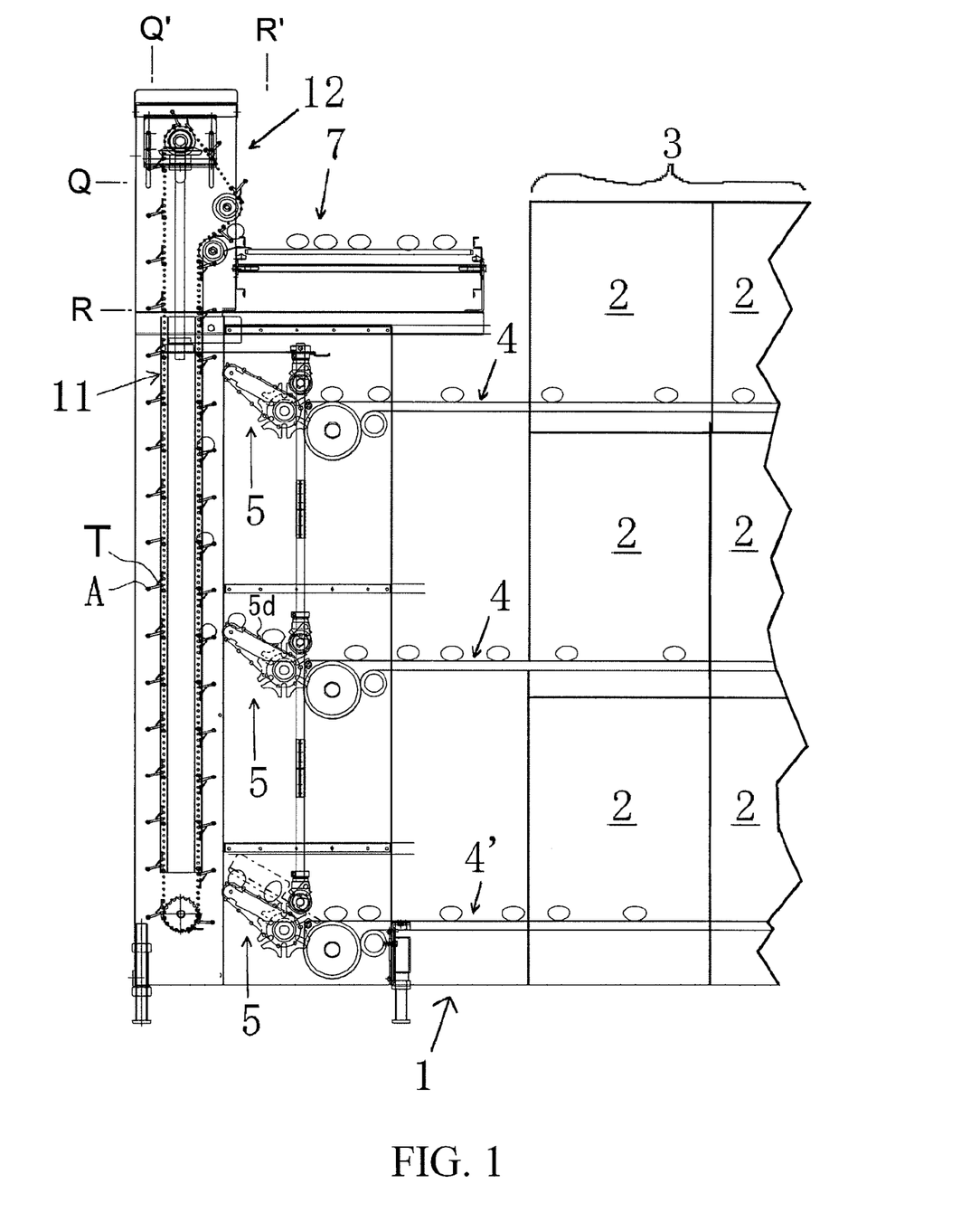
FIG. 1 is a schematic lateral view of an egg collection system equipped with an egg roll out mechanism for an egg collector according to the present invention.
Figure 2:
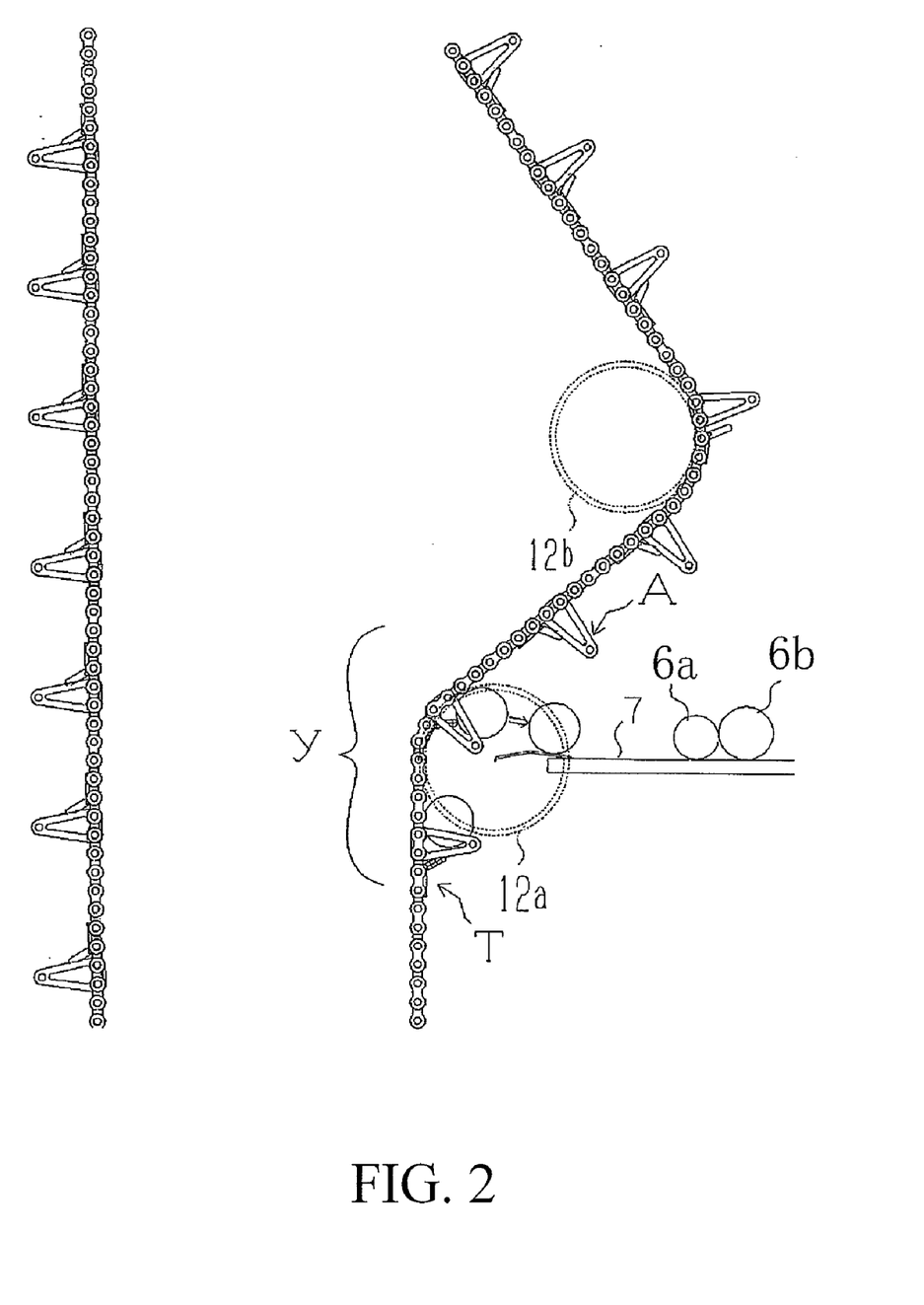
FIG. 2 is enlarged schematic view of the part taken along Q-Q'-R-R' in FIG. 1.
Figure 3:
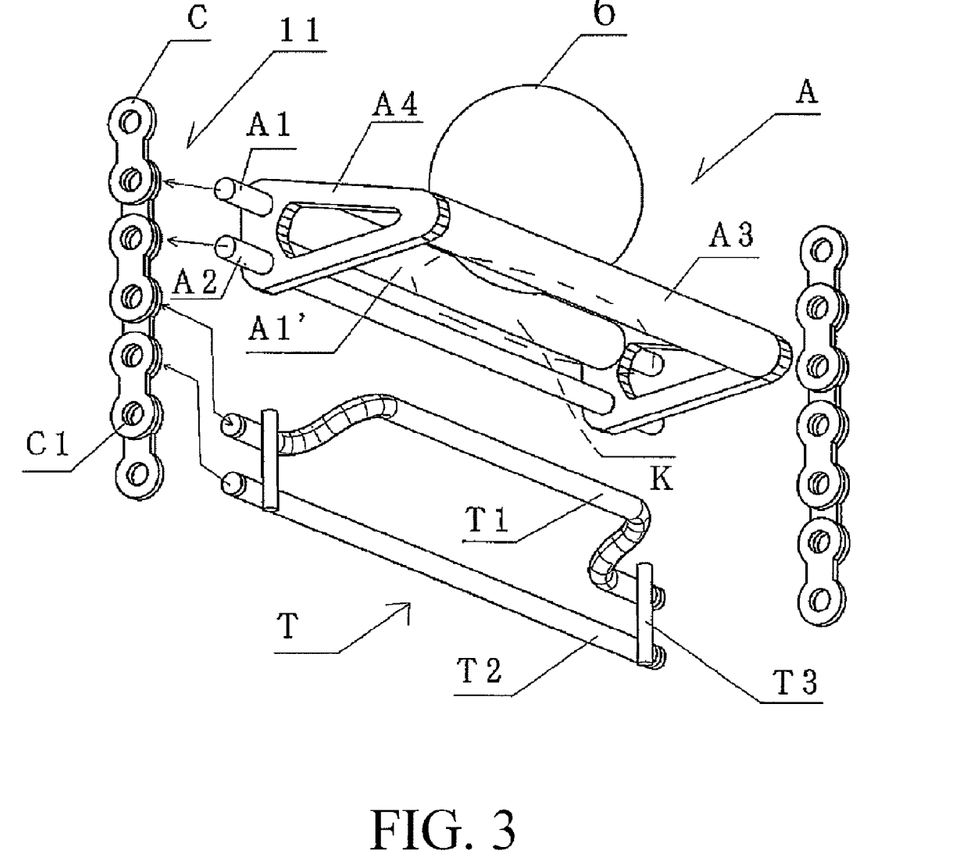
FIG. 3 is an exploded schematic perspective view of the components of a unit of the egg roll out mechanism.
Figure 4:
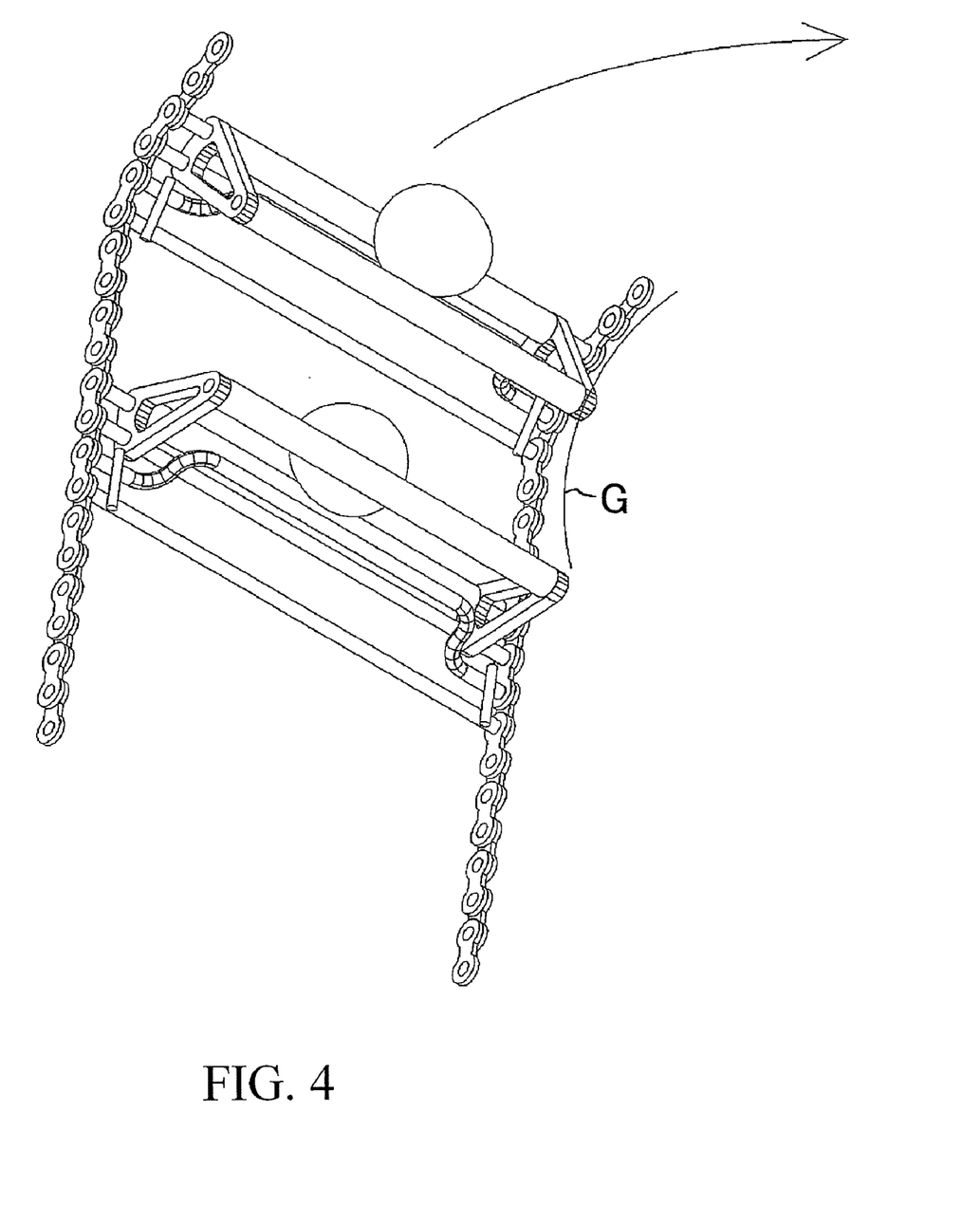
FIG. 4 is a schematic perspective view of an assembled unit of the egg roll out mechanism.

FIG. 1 is a schematic lateral view of an egg collection system equipped with an egg roll out mechanism for an egg collector according to the present invention FIG. 2 is enlarged schematic view of the part taken along Q-Q'-R-R'. FIG. 3 is an exploded schematic perspective view of the components of a unit of the egg roll out mechanism. FIG. 4 is a schematic perspective view of an assembled unit of the egg roll out mechanism Throughout the drawings, reference symbol 1 denotes a multi-tier cage unit. The cage unit 1 is formed by vertically laying a plurality of cage tiers 3, each cage tier 3 being divided into cage cells 2. An egg collection conveyor 4 is arranged along each cage tier 3 and all the egg collection conveyors 4 are adapted to collect the eggs laid by the hens confined in the cage cells 2 of the corresponding respective cell tiers 3 and transfer them to one of the opposite ends (the left end in FIG. 1) of the cage unit 1.

Control conveyors 5 and an egg collection/vertical transfer device 12 are arranged at the left end of the cage unit 1 to which eggs are transferred by the egg collection conveyors 4. A cumulative egg collection conveyor 7 is arranged above the control conveyors 5 so as to be located adjacent to an upper part of the egg collection/vertical transfer device 12 and extend from it in a direction substantially orthogonal relative to the longitudinal direction of the cage unit 1 (although the cumulative egg collection conveyor 7 may be arranged below the egg collection/vertical transfer device 12 if desired).

The control conveyors 5 are respectively provided with looped egg bearing shafts 5d so as to correspond to the egg collection conveyors 4 of the tiers of the cage unit 1, and each of the egg bearing shafts 5d operates to transfer an egg from the corresponding egg collection conveyor 4 to the egg collection/vertical transfer device 12 at a time, controlling the attitude of the rolling egg.

The egg collection/vertical transfer device 12 is provided with an endless conveyor 11 that is driven to rotate and move along a substantially vertical track from below the egg collection conveyor 4' of the lowest tier of the cage unit 1 to above the cumulative egg collection conveyor 7 that is arranged at a high position. A plurality of bar type egg receiving members A (which are only exemplar egg bearing means for the purpose of the present invention) are fitted to the endless conveyor 11 at regular intervals, and egg roll out cross bar assemblies T are arranged blow the respective bar type egg receiving members A. Egg roll out cross bar assemblies are principal components of an egg roll out mechanism according to the present invention.

Now, the components of the egg roll out mechanism will be described below by referring to FIG. 3. In FIG. 3, reference symbol 11 denotes an endless conveyor and A denotes a bar type egg receiving member, while T denotes an egg roll out cross bar assembly. The endless conveyor 11 is a chain assembly formed by chains each of which is by turn formed by rotatably linking a plurality of substantially 8-shaped component links C by means of link sections C1 (such a chain assembly being of a commercially available standard type).

Each bar type egg receiving member A includes a pair of link/bearing rods A1 and A2 to be driving into and secured to a corresponding link section C1, the link/bearing rods A1 and A2 being arranged in parallel with each other, and substantially triangular side wall members A4, A4 arranged at the opposite ends of the pair of link/bearing rods A1 and A2 as well as egg bearing rods A1' and A3 extending between the side wall members A4, A4 and formed by a material (e.g., a plastic material) that does not apply any significant impact to an egg. The egg bearing rod A is arranged around and secured to the link/bearing rod A1, while the egg bearing rod A3 is fitted to the lateral wall members A4, A4 at positions remote from the chains. An egg is borne by a bar type egg receiving member A so as to extend over and ride on the egg bearing rods A1' and A3 and the bottom of the egg is suspended in the space section K between the bearing rods A1' and A3.

On the other hand, each egg roll out assembly T includes a cross bar member T1 projecting with an angle toward the corresponding space section K, an assembling rod member T2 for stably holding the cross bar member T1 between the chains and a pair of link rods for linking the cross bar member T1 and the assembling rod member T2 typically by welding.

The bar type egg receiving members A and the egg roll out assemblies T that are linked to the corresponding link sections C1 are arranged adjacently but separated from each other by a link section (although the interval separating them from each other may not necessarily be a link section C1 and they may alternatively be separated from each other by two link sections C1 depending on the profile of the track of the endless conveyor 11, that of the bar type egg receiving members A and that of the egg roll out assemblies T).

FIG. 4 is an enlarged partial perspective view of a bar type egg receiving member A and an egg roll out assembly T of the part indicated by y in FIG. 2 as viewed askance from below. Note that the sprocket G for defining the track of the chain conveyor is illustrated only in a simplified manner.

Figure 5A:
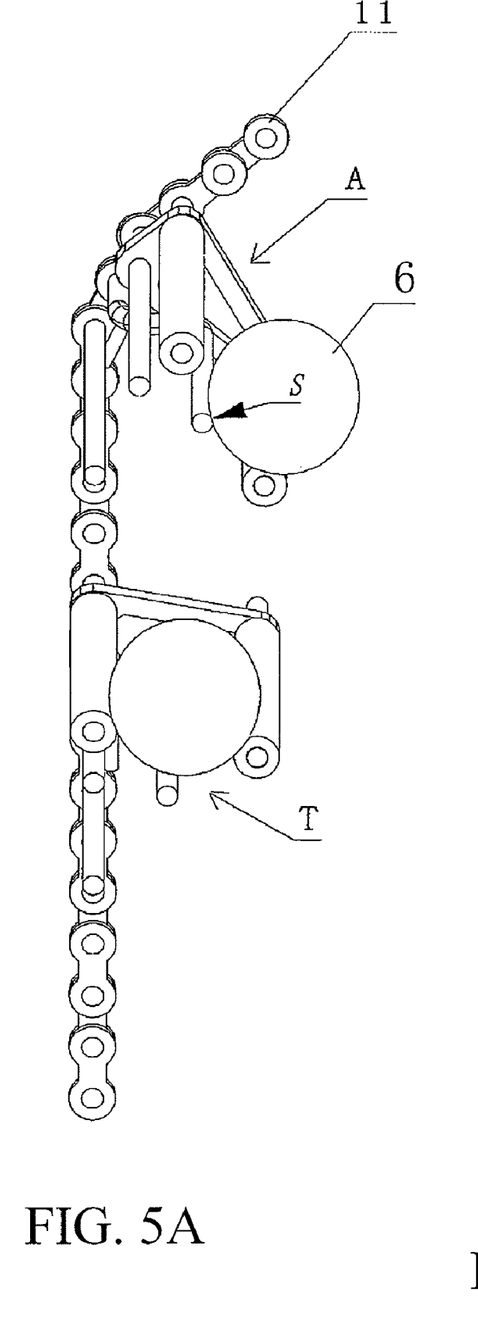
FIG. 5A is a schematic perspective view of a part of the egg roll out mechanism, showing the operation of a unit thereof in FIG. 4 as viewed from above.
Figure 5B:
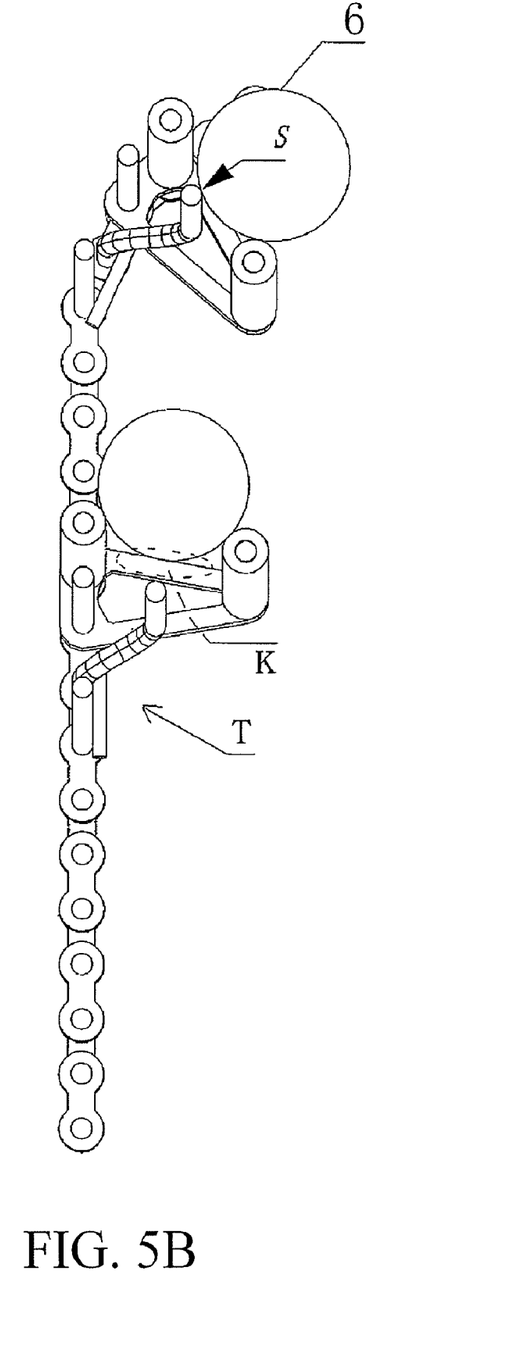
FIG. 5B is a schematic perspective view of the part of the egg roll out mechanism, showing the operation thereof as viewed from below.

FIGS. 5A and 5B show the bar type egg receiving member A and the egg roll out assembly T of FIG. 4 in perspective cross sectional view taken along the center lines thereof. While FIGS. 5A and 5B shows the same part, FIG. 5A is an oblique view taken from above and FIG. 5B is an oblique view taken from below. Each of FIGS. 5A and 5B shows two pairs of a bar type egg receiving member A and an egg roll out assembly T arranged adjacently relative to each other. The bar type egg receiving member A and the egg roil out assembly T of the lower pair are located on a vertical straight line or the bar type egg receiving member A is located right above the egg roll out assembly T. In other words, the chains of the endless conveyor 11 are extending vertically straight at the lower pair (and naturally below the sprocket drawing the chains but they are curved on the sprocket along the outer periphery of the latter including the parts thereof where the bar type egg receiving member A and the egg roll out assembly T of the upper pair are located). With regard to the positional relationship of the bar type egg receiving member A and the egg roll out assembly T of the lower pair, the bottom of the borne egg and the cross bar member T1 are maximally separated from each other. Note that the bottom of the borne egg and the cross bar member T1 are maximally separated from each other if the egg born on the bar type egg receiving member A is small and a considerable part thereof is in the space section. On the other hand, the bar type egg receiving member A and the egg roll out assembly T of the upper pair have already got onto the guide sprocket 12a of the egg collection/vertical transfer device 12 in FIGS. 5A and 5B. Differently stated, the components C1 of the chains C that affect the motion of the bar type egg receiving member A and that of the egg roll out assembly T are found on the guide sprocket 12a and the bar type egg receiving member A and the egg roll out assembly T are tilted with different respective angles along the track of the chain conveyor that is dependent on the diameter of the guide sprocket 12a. Due to the difference of the angles, the cross bar member T1 of the egg roll out assembly T gets to the space K where the bottom of the egg borne on the bar type egg receiving section A is located. Then, as a result, the bottom of the egg and the cross bar member T1 contact each other when the egg is relatively small (at position S in FIGS. 5A and 5B). The contact becomes gradually intensified as the track of the chain conveyor changes and hence the impact applied to the egg is minimized.

Figure 6:
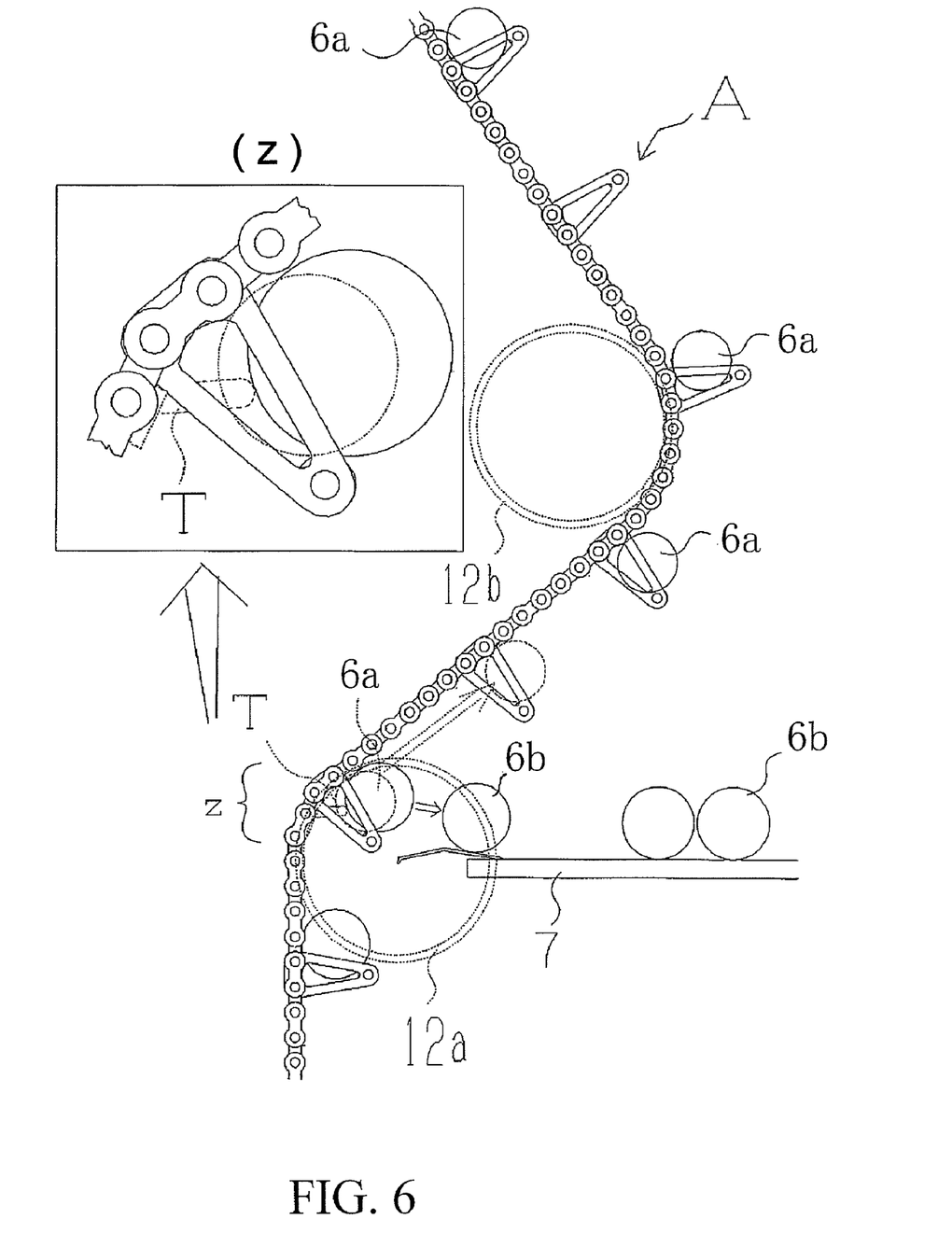
FIG. 6 is schematic lateral view of a part of the egg roll out mechanism, showing some of the components of the egg roll out mechanism designed according to the present invention in dotted lines and the arrangement of the prior art in solid lines, and In FIG. 6, (Z) is an enlarged view of the part indicted by Z.

FIG. 6 is schematic lateral view of a part of a conventional chain conveyor that is not provided with any egg roll out assembly T. If the size of the egg on an egg receiving member A is small and either or both of the egg bearing rods A1' and A3 of the egg receiving member A are smeared and sticky, the egg may be held to the sticky egg bearing rods and would not come out from the latter so as to fall in trouble. Note that an egg roll out mechanism according to the present invention is indicated by dotted lines.

The egg bearing means described above for the illustrated embodiment is of a type formed by two egg bearing rods. However, the mode of bearing an egg of an egg bearing means is not limited to the above described one so long as the egg bearing means is provided with a space section for holding the bottom of the borne egg in suspension.

Additionally, while the diameter of the sprocket 12a specifies the direction of each part of the endless conveyor located thereon in the above described embodiment, any mechanism may alternatively be employed so long as the direction of each related part (and hence the running track) of the endless conveyor can be defined appropriately. For example, small sprockets may be arranged along the track of the chain conveyor.

Finally, the egg roll out assembly T may get to the space section K to push the bottom of the egg not necessarily only once but more than once. In other words, it may be so arranged that the bottom of the egg is pushed to such an extent that the egg would not roll out on the way of being conveyed before it is ultimately rolled out. With such an arrangement, a situation where the egg on the egg bearing means A sticks to the latter can be avoided from taking place. Then, the egg can be reliably rolled out as the bottom thereof is pushed by the egg rolling out assembly exactly at the time when it should be properly rolled out.

EXPLANATION OF REFERENCE SYMBOLS

A: bar type egg receiving member, egg bearing means
T: egg roll out cross bar assembly
1: multi-tier poultry cage unit for hens
2: cage cell
3: cage tier
4: egg collection conveyor
5: egg
6: egg
6a: small egg
6b: large egg
7: cumulative egg collection conveyor
11: endless conveyor
12: egg collection/vertical transfer device
12a, 12b: guide sprocket

The invention claimed is:

1. An egg roll out mechanism of an egg collector comprising:
    a multi-tier poultry cage unit (1) for hens having a plurality of vertically arranged cage tiers (3);
    a plurality of egg collection conveyors (4) extending longitudinally along the respective cage tiers (3) and arranged to collect the eggs laid by the hens confined in the cage cells (2) of the cage tiers and convey them to one of the horizontal and longitudinal opposite ends of the cage tiers (3); and
    an egg collection/vertical transfer device (12) arranged at one of the opposite ends of the multi-tier poultry cage unit (1) for hens and adapted to receive the eggs conveyed by the egg collection conveyors (4) and by turn transfer the eggs upward or downward to a predefined position; and
    the egg collection/vertical transfer device (12) including:
    a plurality of egg receiving members (A) for receiving eggs from the egg collection conveyors (4);
    an endless conveyor (C) mounted with the egg receiving members (A) and adapted to be driven to rotate and move mainly in vertical directions; and a plurality of egg roll out cross bar members (T) arranged respectively adjacent to the egg receiving members (A) at the lower side thereof and provided on the endless conveyer (C);

each of the egg receiving members (A) having a space section (K) for holding the bottom of the egg it bears in suspension;

the relative distance between each of the egg receiving members (A) and the corresponding one of the egg roll out cross bar members (T) being adapted to change according to the change in the transfer direction of the endless conveyor (C), the relative distance being made minimal at the predefined delivery position of the egg receiving member (A) of the egg collection/vertical transfer device so as to allow the corresponding egg roll out cross bar member (T) to get to the space section.

2. An egg roll out mechanism of an egg collector according to claim 1, wherein each of the egg roll out cross bar members (T) gets to the corresponding space section (K) at the delivery position the corresponding egg receiving member of the egg collection/vertical transfer device.

* * * * *